(12) United States Patent
Chen et al.

(10) Patent No.: US 8,595,383 B2
(45) Date of Patent: *Nov. 26, 2013

(54) SYSTEM AND METHOD TO ASSOCIATE A PRIVATE USER IDENTITY WITH A PUBLIC USER IDENTITY

(75) Inventors: Lee Chen, Saratoga, CA (US); John Chiong, San Jose, CA (US); Xin Wang, Fremont, CA (US)

(73) Assignee: A10 Networks, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/153,385

(22) Filed: Jun. 3, 2011

(65) Prior Publication Data

US 2011/0239289 A1 Sep. 29, 2011

Related U.S. Application Data

(63) Continuation of application No. 12/771,491, filed on Apr. 30, 2010, now Pat. No. 7,979,585, which is a continuation of application No. 11/582,613, filed on Oct. 17, 2006, now Pat. No. 7,716,378.

(51) Int. Cl.
*G06F 15/16* (2006.01)
*H04L 29/06* (2006.01)

(52) U.S. Cl.
CPC .................................. *H04L 29/06* (2013.01)
USPC ........................................................ 709/249

(58) Field of Classification Search
USPC .................. 709/200, 227, 249; 713/176, 182; 726/27
See application file for complete search history.

(56) References Cited

U.S. PATENT DOCUMENTS

| 6,182,146 B1 | 1/2001 | Graham-Cumming, Jr. |
| 2003/0191989 A1 | 10/2003 | O'Sullivan |
| 2004/0260651 A1* | 12/2004 | Chan et al. ...................... 705/50 |
| 2005/0009520 A1* | 1/2005 | Herrero et al. ............. 455/435.1 |
| 2007/0206746 A1* | 9/2007 | Andreasson et al. .... 379/142.01 |
| 2007/0294209 A1* | 12/2007 | Strub et al. ........................ 707/1 |

FOREIGN PATENT DOCUMENTS

| CN | 1449618 A | 10/2003 |
| WO | WO0221788 A2 | 3/2002 |

* cited by examiner

*Primary Examiner* — Peter Shaw
(74) *Attorney, Agent, or Firm* — Finnegan, Henderson, Farabow, Garrett & Dunner, L.L.P.

(57) ABSTRACT

The inventive system includes a host, a network including a security gateway, and a public application. Established are an access session between the network and the host and an application session between the public application and the network. An application session record is created for the application session, and includes the user's public user identity used to access the public application, the user's private user identity used to access the network, a host identity, and an application session time. To determine the private user identity for the application session, the security gateway sends a query with the host identity and the application session time. These are compared with the host identity and access session time in an access session record. If they match, then the private user identity in the access session record is returned, and it is stored as the private user identity in the application session record.

26 Claims, 8 Drawing Sheets

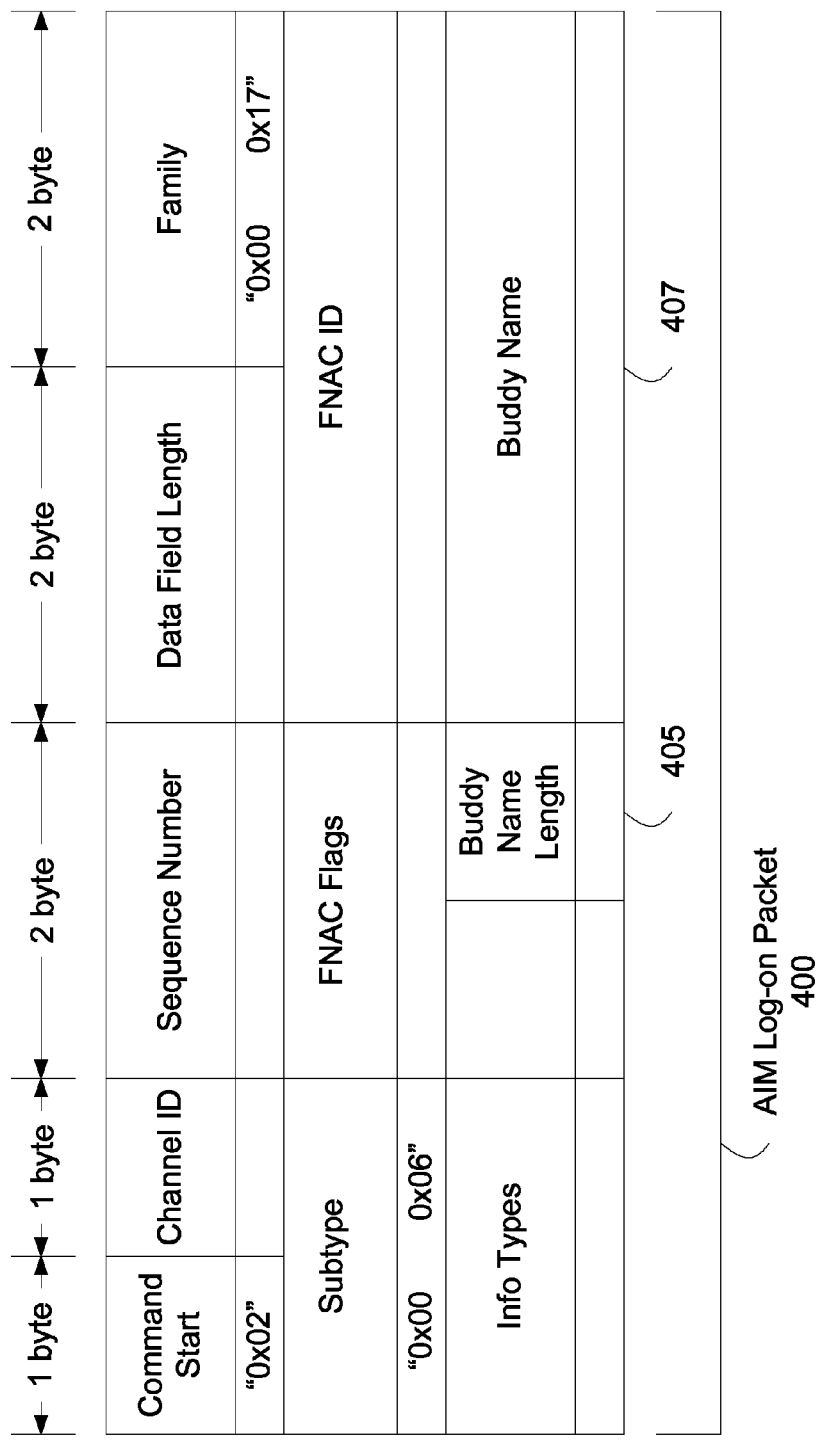

SYSTEM AND METHOD TO ASSOCIATE A PRIVATE USER IDENTITY WITH A PUBLIC USER IDENTITY

CROSS-REFERENCE TO RELATED APPLICATIONS

The present application is a continuation of co-pending U.S. patent application entitled "System and Method to Associate a Private User Identity with a Public User Identity", Ser. No. 12/771,491, filed on Apr. 30, 2010, which is a continuation of U.S. patent application entitled "System and Method to Associate a Private User Identity with a Public User Identity, Ser. No. 11/582,613, filed on Oct. 17, 2006, now U.S. Pat. No. 7,716,378.

BACKGROUND OF THE INVENTION

1. Field

This invention relates generally to data networking, and more specifically, to a system and method to associate a public user identity with a private user identity during an application session.

2. Related Art

The secure data network of a company is a critical component for day-to-day functioning of company business activities. Company employees access the secure data network for communication within the company and with the outside world. Company information, oftentimes proprietary or confidential, is exchanged during the communication.

Typically, an employee gains access to the company's secure data network by means of a network logon procedure using a private user identity, such as a user name "Robert P. Williamson" or an employee number "NGO1-60410". Subsequent information exchange using the company's office applications, such as email, file transfer or document control is traceable based on the private user identity through network event logs.

Since the late 1990's, we have been witnessing the phenomenal rising popularity of public communication services, such as email and Instant Messaging offered by Yahoo™, America Online™ (AOL), or Google™, conferencing and collaboration services offered by Webex™ or Centra™, or peer-to-peer services for a variety of file sharing. Generally, a public communication service allows a user to exchange information through messaging, text chat or document exchange using a public user identity, such as "butterdragon", "fingernail 1984", or "peterrabbit".

However, in a company setting, when an employee connects to a public communication service with a public user identity over the company's secure data network, the information exchange is not easily traceable if at all since the public user identity is not tied to the private user identity.

In one example, a company's information technology (IT) department notices that an employee Victor has been using the company's email system to send out proprietary documents, violating the company's security policy. After issuing a warning to Victor, the IT department finds no further violations. Unfortunately, they are not aware of the fact that Victor has continued this activity using Yahoo™ email with a public user identity "PiratesOfCaribbean@Yahoo.com".

In another example, two weeks before a major trade show, a company implements a security measure to monitor communication activities of employees of director level and above to ensure confidentiality of competitive information. This security measure, covering company email, phone conversation and voice messaging, nevertheless proves to be a failure as sensitive information leaks out to a business reporter anyway prior to the trade show. The source of the leak may never be confirmed, but the business reporter privately discloses that he gets the information from an anonymous employee of the company using AOL Instant Messaging™ with screen name "opensecret2006".

The above discussion illustrates the need for a solution to associate a public user identity to a private user identity.

BRIEF SUMMARY OF THE INVENTION

A system and method for associating a private user identity with a public user identity is disclosed. The system includes a host, a network which includes a security gateway, and a public application residing externally to the network. An access session is established between the network and the host. An application session is established between the public application and the network via the security gateway, and an application session record is created for it. The application session record includes the user's public user identity, used to access the public application, and the user's private user identity, used for accessing the network through the host. It further includes a host identity, and an application session time. To determine the private user identity for the application session, the security gateway queries an identity server, on which the access session record resides. The host identities in the application and access session records are then compared, as well as the access session time with the application session time. If they match, then the private user identity in the access session record is returned to the security gateway, which stores it as the private user identity in the application session record.

BRIEF DESCRIPTION OF THE SEVERAL VIEWS OF THE FIGURES

FIG. 4b illustrates a data packet in an AIM log-on packet.

DETAILED DESCRIPTION OF THE INVENTION

Figure 1A:
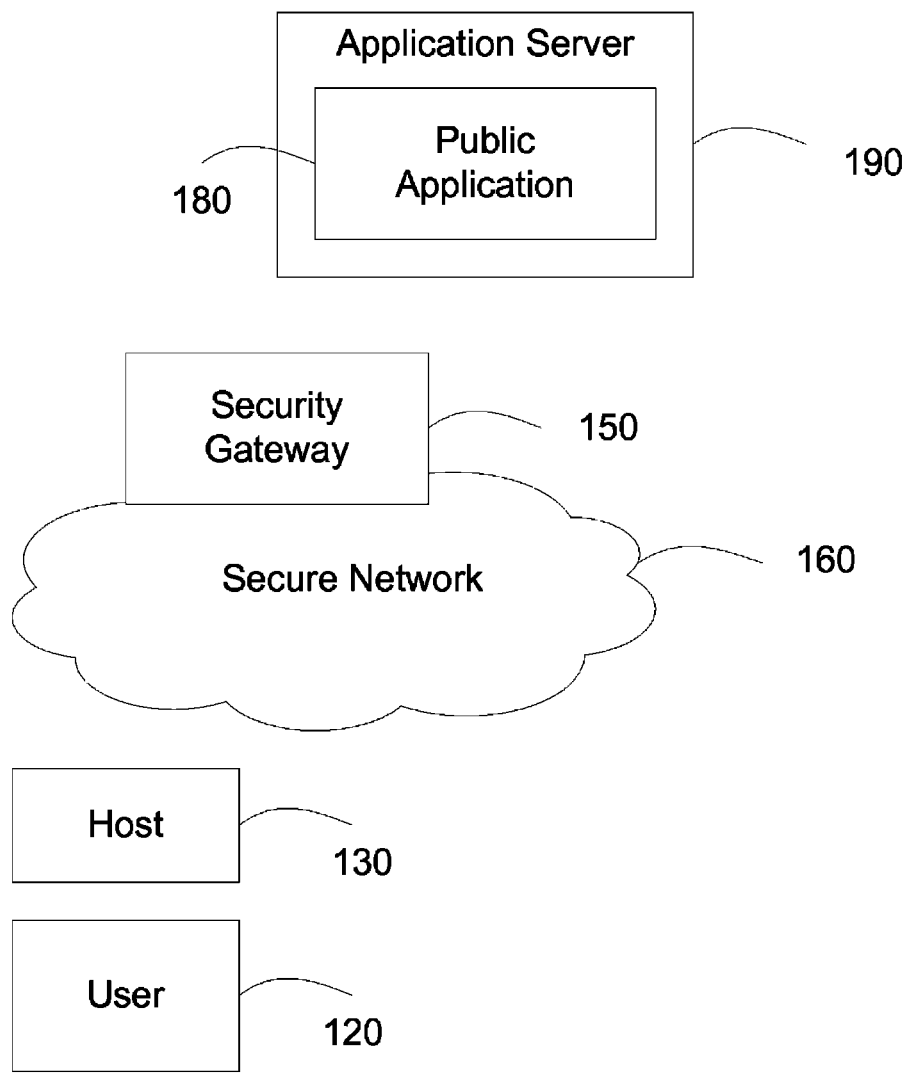
FIG. 1a illustrates a secure network.

FIG. 1 a illustrates a secure network.

A secure network 160 includes a host 130. User 120 uses host 130 to access a public application 180 hosted in application server 190. Application server 190 is outside of secure network 160. The network traffic between host 130 and application server 190 passes through security gateway 150.

Host 130 is a computing device with network access capabilities. In one embodiment, host 130 is a workstation, a desktop personal computer or a laptop personal computer. In one embodiment, host 130 is a Personal Data Assistant (PDA), a smartphone, or a cellular phone.

In one embodiment, secure network 160 is an Internet Protocol (IP) network. In one embodiment, secure network 160 is a corporate data network or a regional corporate data network. In one embodiment, secure network 160 is an Internet service provider network. In one embodiment, secure network 160 is a residential data network. In one embodiment, secure network 160 includes a wired network such as Ethernet. In one embodiment, secure network 160 includes a wireless network such as a WiFi network.

Public application 180 provides a service that allows user 120 to communicate with other users in a real-time fashion. In one embodiment, the service includes text chat. In one embodiment, the service includes a voice call or a video call. In one embodiment, the service includes a network game. In one embodiment, the service includes exchanging a document, such as sending or receiving a text document, a powerpoint presentation, an excel spreadsheet, an image file, a music file or a video clip.

In one example, public application 180 provides America Online Instant Messenger™ service. In one example, public application 180 provides Yahoo Instant Messenger™ voice service. In one embodiment, public application 180 provides a file sharing service such as Kazaa™ file sharing service. In one embodiment, public application 180 provides a network game service such as Microsoft™ Network Game service.

Security gateway 150 is situated at the edge of secure network 160. Security gateway 150 connects secure network 160 to public application 180. Security gateway 150 receives network traffic from secure network 160 and transmits the network traffic to application server 190. Likewise, security gateway 150 receives network traffic from application server 190 and transmits the network traffic to secure network 160.

In one embodiment, security gateway 150 includes the function of a corporate Wide Area Network (WAN) gateway. In one embodiment, security gateway 150 includes the function of a residential broadband gateway. In one embodiment, security gateway 150 includes the function of a WAN gateway for an Internet service provider.

Figure 1B:
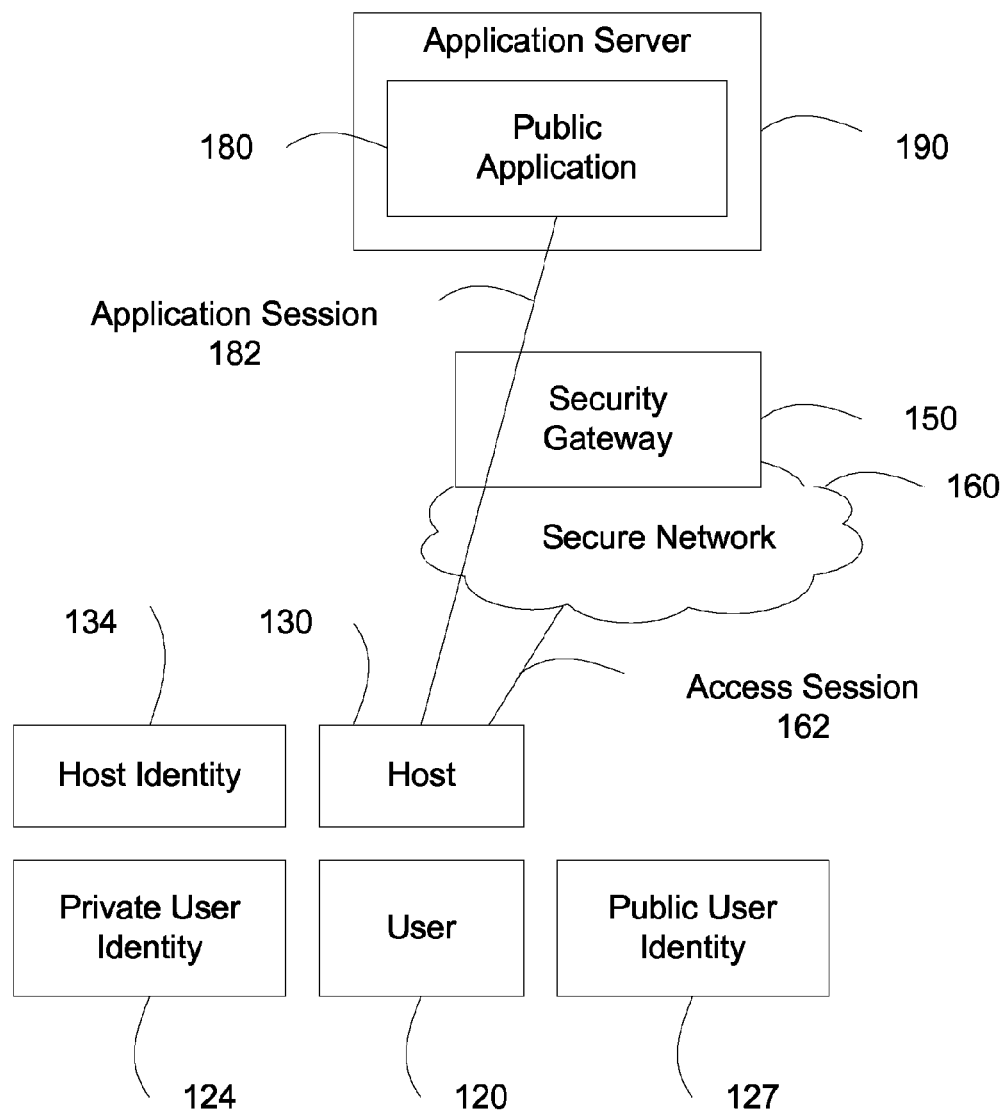
FIG. 1b illustrates an access session and an application session.

FIG. 1b illustrates an access session and an application session.

User 120 uses host 130 to access secure network 160 during an access session 162.

Host 130 has a host identity 134. Host 130 uses host identity 134 to connect to secure network 160. In one embodiment, host identity 134 includes an IP address. In one embodiment, host identity 134 includes a Media Access Control (MAC) address.

Within secure network 160, user 120 has a private user identity 124. In one embodiment, private user identity 124 is an employee number or an employee name. In one embodiment, private user identity 124 is an Internet service subscription identity. In one embodiment, access session 162 is established after a successful network user log-in procedure, such as an employee network log-in, for secure network 160 using private user identity 124. Private user identity 124 is associated with host identity 134.

User 120 uses host 130 to access public application 180 in an application session 182. User 120 uses a public user identity 127 during application session 182. In one embodiment, public application 180 prompts user 120 to log-in before establishing application session 182. During the application user log-in procedure, user 120 provides to public application 180 public user identity 127. In another embodiment, public application 180 selects a public user identity 127 for user 120 for application session 182. In one embodiment, public user identity 127 is set up through a user registration process or a service subscription process. Network traffic in application session 182 passes through security gateway 150.

Figure 1C:
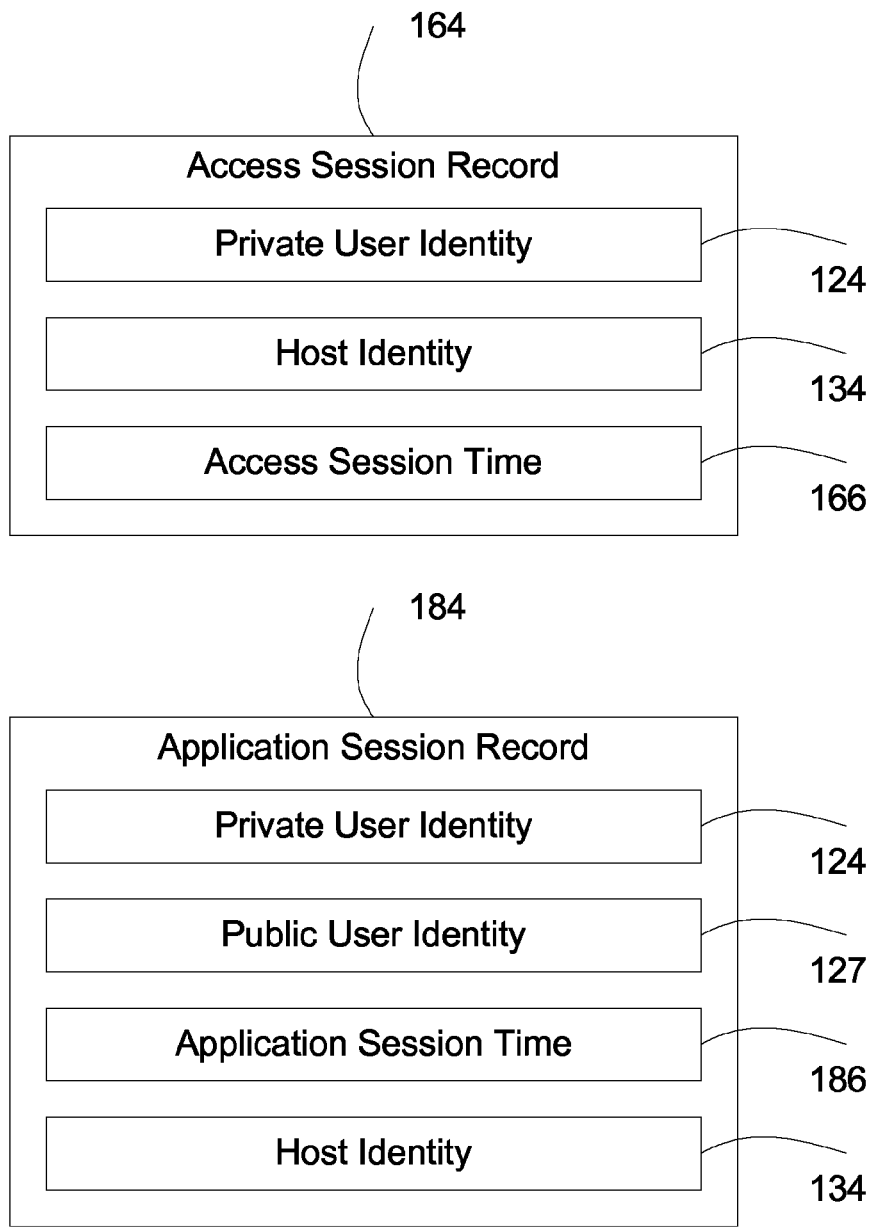
FIG. 1c illustrates an access session record and an application session record.

FIG. 1c illustrates an access session record and an application session record.

Access session record 164 records information about access session 162. The information includes private user identity 124, host identity 134 and access session time 166. In one embodiment, access session time 166 is the starting time when access session 162 is established. In one embodiment, access session time 166 includes the starting time and the ending time when user 120 finishes access session 162.

Application session record 184 records information about application session 182. The information includes private user identity 124, public user identity 127, and application session time 186. In one embodiment, the information further includes host identity 134. In one embodiment, application session time 186 includes the starting time when application session 182 is established. In one embodiment, application session time 186 includes a time stamp during application session 182. In one embodiment, application session time 186 includes a time stamp when security gateway 150 recognizes application session 182.

Figure 2:
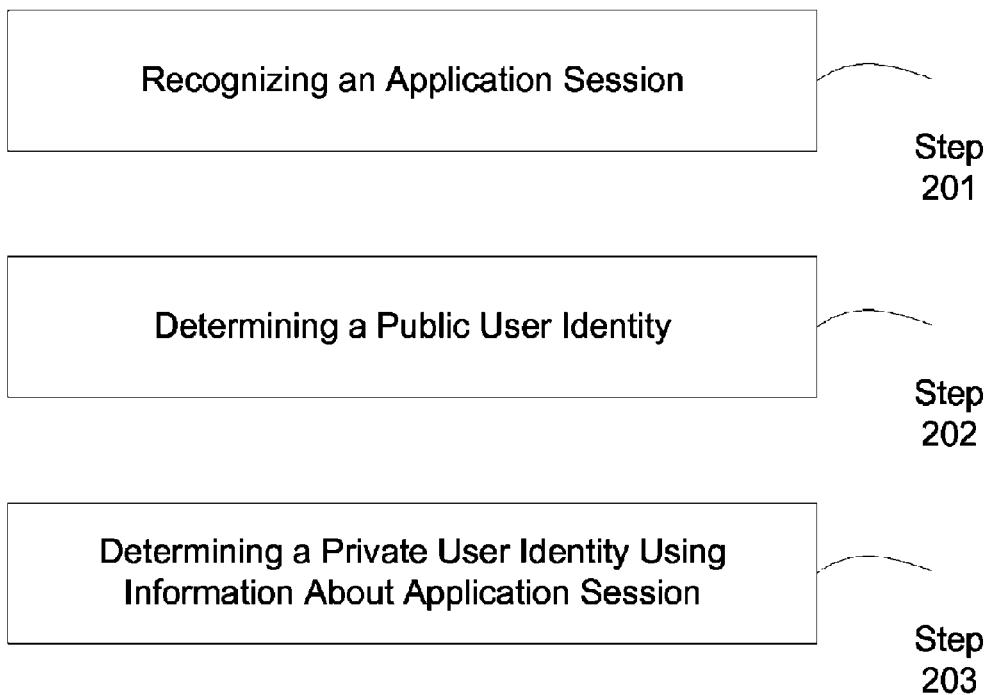
FIG. 2 illustrates a process to generate an application session record.

FIG. 2 illustrates a process to generate an application session record.

The process of generating application session record 184 includes multiple steps.

In step 201, security gateway 150 recognizes an application session.

In step 202, security gateway 150 determines a public user identity of the application session.

In step 203, security gateway 150 determines a private user identity using information about the application session.

Figure 3:
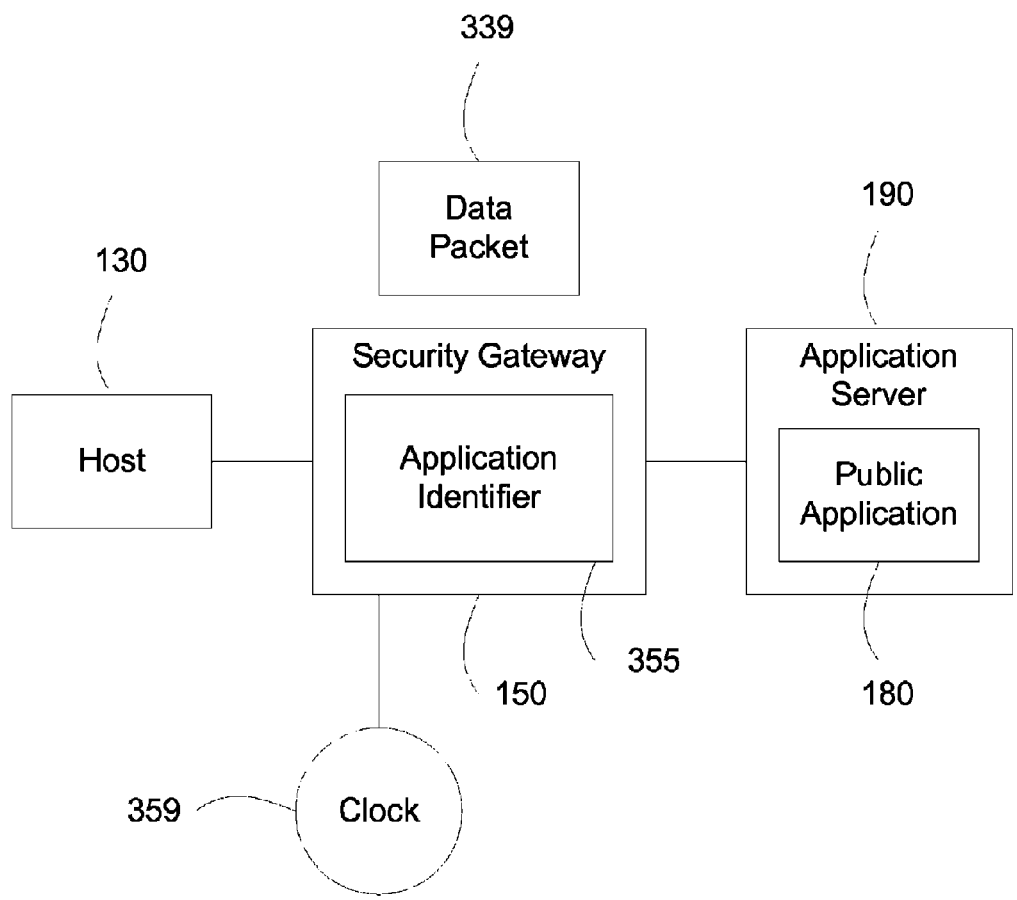
FIG. 3 illustrates a process to recognize an application session.
Figure 4A:
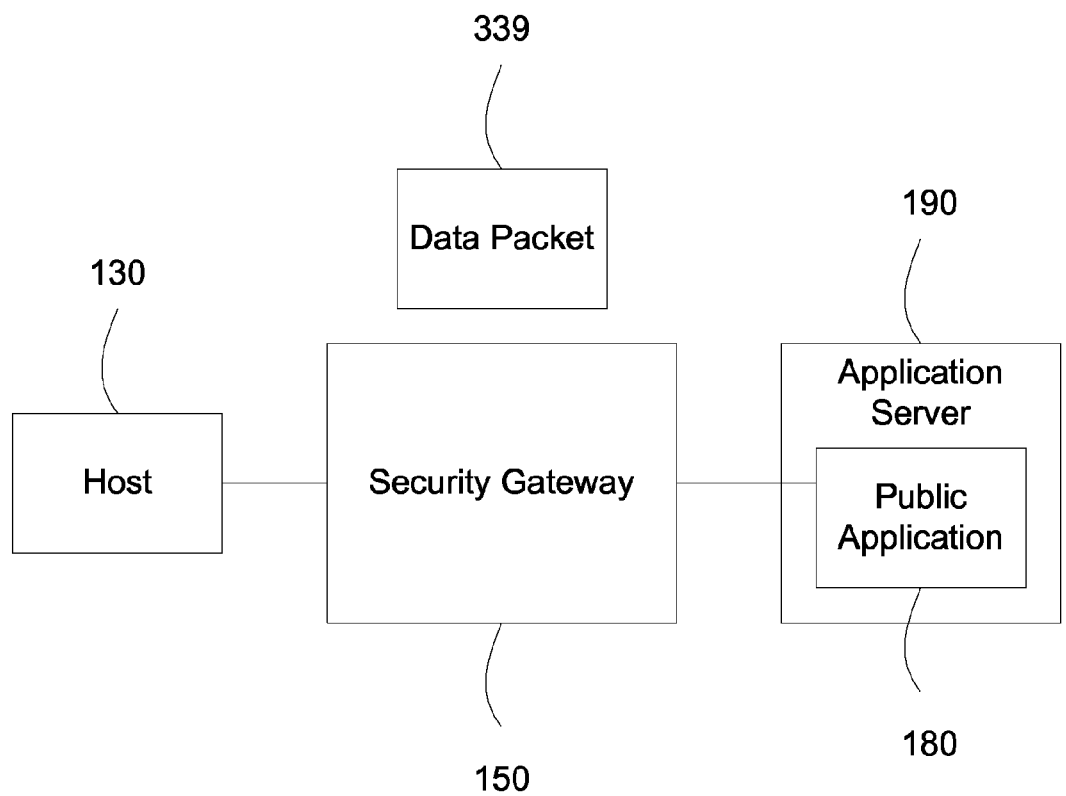
FIG. 4a illustrates a process to determine a public user identity of application session.
Figure 5:
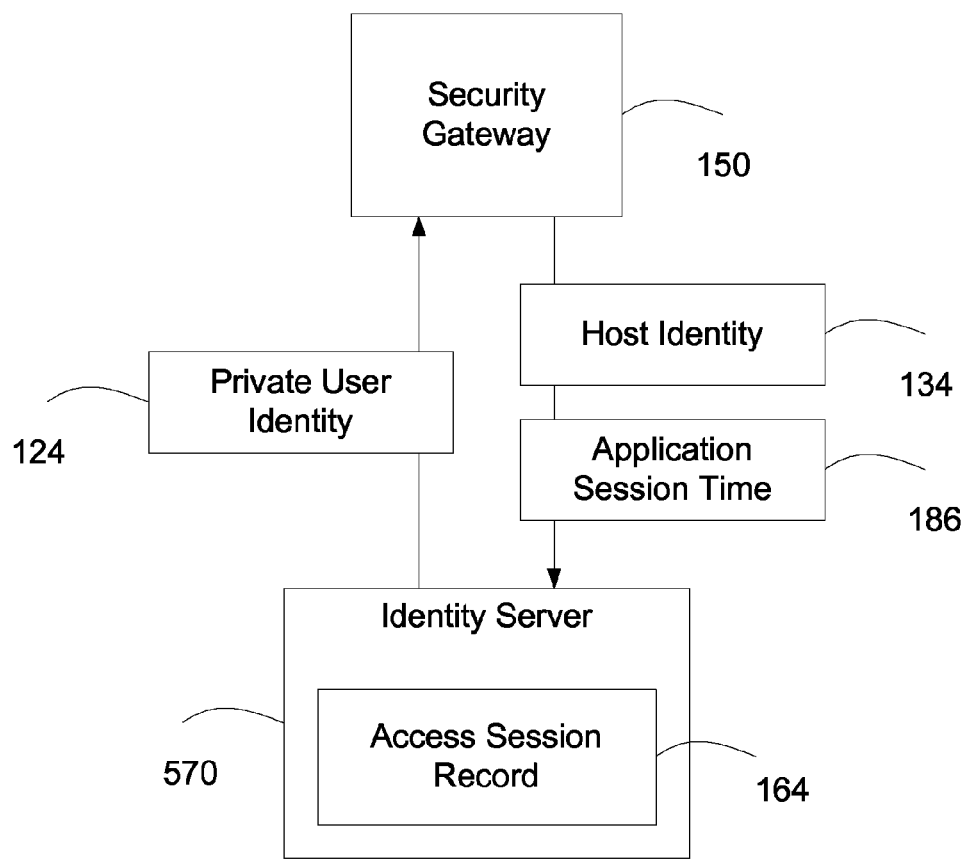
FIG. 5 illustrates a process to determine a private user identity.

FIGS. 3-5 illustrates steps 201-203 respectively.

FIG. 3 illustrates a process to recognize an application session.

Security gateway 150 inspects network traffic between host 130 and application server 190 to recognize application session 182 for public application 180.

In one embodiment, security gateway 150 inspects data packet 339 between host 130 and application server 190 for the recognition of application session 182.

Security gateway 150 includes an application identifier 355 for public application 180. Application identifier 355 includes information for recognizing application session 182. In one embodiment, application identifier 355 includes a transport layer information, such as Transmission Control Protocol (TCP) or User Diagram Protocol (UDP); and at least one transport port number, such as a TCP port number or a UDP port number. In one embodiment, application identifier 355 includes application layer information, such as one or more data filters wherein a data filter specifies a value and a position of the value in a data packet. In one example, a data filter is [byte 0 with value "0x52"]. In one example, a data filter is [byte 4-7 with ASCII value of "ADEH"].

Security gateway 150 matches data packet 339 against application identifier 355.

In one embodiment, application identifier 355 includes transport protocol type of TCP and a destination TCP port number of 5190, the TCP port number used by AIM protocol. In this embodiment, data packet 339 is a TCP packet from host 130 to application server 190. Security gateway 150 matches data packet 339 against application identifier 355 and determines that public application 180 provides AIM service.

Security gateway 150 creates application session record 184. Security gateway 150 extracted the source IP address from the IP header of data packet 339, and stores the source IP address as host identity 134. In one embodiment, data packet 339 includes link layer information, such as a source MAC address; security gateway 150 extracts and stores the source MAC address as host identity 134.

In one embodiment, security gateway 150 connects to a clock 359. Clock 359 indicates the current time of day. Security gateway 150 stores the time of day indicated by clock 359 in application session time 186.

FIG. 4a illustrates a process to determine a public user identity of application session 182.

The method for determining public user identity 127 is typically specific to public application 180. In one embodiment, data packet 339 is an application packet. For example, public application 180 provides AIM service; data packet 339 is an AIM packet.

An AIM packet includes multiple fields, for example

Command start field is a 1-byte data field starting at byte offset 0 having a fixed hexadecimal value "0x02";

Channel ID field is a 1-byte data field starting at byte offset 1;

Sequence number field is a 2-byte integer starting at byte offset 2;

Data field length field is a 2-byte data field starting at byte offset 4;

Family field is a 2-byte data field starting at byte offset 6; and

Subtype field is a 2-byte data field starting at byte offset 8.

An AIM log-on packet is a AIM packet with family field having a fixed hexadecimal value of "0xOO 0x1?" and subtype field having a fixed hexadecimal value of "0xOO 0x06".

AIM log-on packet further includes buddy name length field, a 1-byte integer starting at byte offset 19, and a variable length buddy name field starting at byte offset 20. Buddy name length field indicates the length in bytes of buddy name field.

Security gateway 150 matches data packet 339 to determine if data packet 339 is an AIM log-on packet. In one embodiment, data packet 339 is an AIM log-on packet 400 illustrated in FIG. 4b. Security gateway 150 extracts buddy name length field 405. Security gateway 150 furthers extracts buddy name field 407. In this embodiment, buddy name length field 405 is integer "13" and buddy name field 407 is "JohnSmith1984". Security gateway 150 stores "JohnSmith1984" as public user identity 124 in application session record 184.

In one embodiment, data packet 339 is not an AIM log-on packet. Security gateway 150 inspects another data packet from host 130.

FIG. 5 illustrates a process to determine a private user identity.

Secure network 160 includes an identity server 570. Identity server 570 includes access session record 164 of access session 162 during which user 120 accesses application session 182.

Security gateway 150 queries identity server 570. Security gateway 150 sends host identity 134 and application session time 186 to identity server 570.

Identity server 570 receives host identity 134 and application session time 186. Identity server 570 matches host identity 134 and application session time 186 against access session record 164. Identity server 570 determines that host identity 134 matches host identity of access session record 164. Identity server 570 further determines that application session time 186 matches access session time 166 of access session record 164 as application session time 186 is between the starting time and the ending time of access session record 164. Identity server 570 sends private user identity 124 of access session record 164 to security gateway 150 as a response to the query.

Security gateway 150 receives private user identity 124 from identity server 570, and stores private user identity 124 in application session record 184.

In one embodiment, security gateway 150 stores public user identity 127 in application session record 184 after recognizing a log-on approval indication for the public user identity 127 from public application 180.

In one embodiment, security gateway 150 queries identity server 570 immediately after determining public user identity 127. In one embodiment, security gateway 150 queries identity server 570 after application session 182 ends.

In one embodiment, security gateway 150 queries identity server 570 by sending a plurality of host identities in a bulk request; and receives a plurality of private user identities in a bulk response.

In one embodiment, application session record 184 includes additional user information associated with private user identity 124, such as cubicle or office number, cubicle or office location, telephone number, email address, mail-drop location, department name/identity, or manager name.

In one embodiment, security gateway 150 obtains the additional user information from identity server 570. In one embodiment, security gateway 150 obtains the additional user information by querying a different server, such as a corporate directory server, by using the private user identity 124 received from identity server 570.

In one embodiment, security gateway 150 generates a security report based on application session record 184. In one embodiment, security gateway 150 generates a security report based on a pre-defined private user identity or a list of pre-defined private user identities. In one embodiment, security gateway 150 generates a security report based on a pre-defined schedule or when requested by an operator. In one embodiment, security gateway 150 generates a security report based on corporate security policy.

In one embodiment, public application 180 provides file transfer service using File Transfer Protocol (FTP) protocol or a proprietary protocol. In one embodiment, public application 180 provides email service using Simple Mail Transfer Protocol (SMTP), Internet Message Access Protocol (IMAP) or Post Office Protocol version 3 (POP3) protocol.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

What is claimed is:

1. A computer-implemented method for associating first and second user identities, comprising:

receiving, via a hardware security gateway having at least one software component, a first host identity for a first host and a first user identity used in an application session conducted through the first host;

receiving an application session time associated with the application session;

acquiring a second host identity for a second host and a second user identity used in an access session conducted through the second host;

acquiring an access session time associated with the access session; and associating, via the hardware security gateway, the first and second user identities if the first host identity corresponds to the second host identity and the access session time corresponds to the application session time.

2. The method of claim 1, wherein receiving the application session time comprising:
    receiving a starting time of the application session; or
    receiving a timestamp associated with the application session.

3. The method of claim 1, wherein the second user identity comprises one of the following:
    a name of the user;
    an Internet service subscription identity; or
    a network log-in.

4. The method of claim 1, wherein each of the first host identity and the second host identity includes:
    an IP address or a Media Access Control (MAC) address.

5. The method of claim 1, wherein acquiring the access session time comprising:
    acquiring a starting time of the access session; and
    acquiring information corresponding to an ending time of the access session.

6. The method of claim 1, wherein the access session time corresponds to the application session time if:
    the application session time is between a starting time and an ending time of the access session.

7. The method of claim 1, further comprising:
    recording application session information, which comprises the first user identity, the second user identity associated with the first user identity, the first host identity, and the application session time.

8. The method of claim 1, further comprising:
    receiving additional user information associated with the second user identity, wherein the additional user information comprises user contact information, location information, or departmental information.

9. The method of claim 1, further comprising:
    generating a security report based on the second user identity associated with the first user identity.

10. A computer-implemented method for associating a user identity used to access a network through a host, comprising:
    creating an application session record for an application session between a network and an application via a security gateway, wherein the application session record comprises the user identity used for accessing the network through the host, a host identity for the host, and an application session time, wherein the creating comprises:
        sending a query including the host identity and the application session time from the application session record;
        receiving, in response to the query, information about an access session between a second host and the network, wherein the information about the access session comprises a second user identity used for accessing the network through the second host, a second host identity for the second host, and an access session time; and
        storing the second user identity as the user identity used for accessing the network in the application session record if the host identity in the application session record matches the second host identity and the access session time matches the application session time.

11. The method of claim 10, wherein the creating the application session record further comprises:

extracting a source IP address or a source Media Access Control (MAC) address from an IP header of a data packet transmitted during the application session; and
storing the source IP address or the source MAC address as the host identity in the application session record.

12. The method of claim 10, wherein the creating the application session record further comprises:
    storing the user identity used for accessing the application in the application session record.

13. The method of claim 11, wherein the application comprises one of the following:
    a communication application or a collaboration application.

14. A computer-implemented method for associating a user identity used to access a network, comprising:
    recording, via a security gateway, information about an application session between a first host and an application over a network, wherein the information about the application session comprises a first host identity for the first host used to access the application and an application session time;
    acquiring information about an access session between a second host and the network, wherein the information about the access session comprises a user identity used for accessing the network through the second host, a second host identity for the second host, and an access session time; and
    recording the user identity used for accessing the network, if the first host identity matches the second host identity and the application session time matches the access session time.

15. The method of claim 14, wherein the user identity used for accessing the network comprises one of the following:
    a name of the user;
    an Internet service subscription identity; or
    a network log-in.

16. The method of claim 14, wherein each of the first host identity and the second host identity includes:
    an IP address or a Media Access Control (MAC) address.

17. The method of claim 14, wherein the application session time matches the access session time if:
    the application session time is between a starting time and an ending time of the access session.

18. A security gateway comprising:
    a hardware processor; and
    a memory containing instructions which, when executed by the hardware processor, cause the hardware processor to perform a method, comprising:
        receiving a first host identity for a first host and a first user identity used in an application session conducted through the first host;
        receiving an application session time associated with the application session;
        acquiring a second host identity for a second host and a second user identity used in an access session conducted through the second host;
        acquiring an access session time associated with the access session; and
        associating the first and second user identities if the first host identity corresponds to the second host identity and the access session time corresponds to the application session time.

19. A security gateway comprising:
    a hardware processor; and
    a memory containing instructions which, when executed by the hardware processor, cause the hardware processor to perform a method, comprising:

creating an application session record for an application session between a network and an application via a security gateway, wherein the application session record comprises the user identity used for accessing the network through the host, a host identity for the host, and an application session time,
wherein the creating comprises:
sending a query including the host identity and the application session time from the application session record;
receiving, in response to the query, information about an access session between a second host and the network, wherein the information about the access session comprises a second user identity used for accessing the network through the second host, a second host identity for the second host, and an access session time; and
storing the second user identity as the user identity used for accessing the network in the application session record if the host identity in the application session record matches the second host identity and the access session time matches the application session time.

20. The security gateway of claim 19, wherein the security gateway extracts a source IP address or a source Media Access Control (MAC) address from a data packet transmitted during the application session, and records the source IP address or the source MAC address as the first host identity.

21. The security gateway of claim 19, wherein the security gateway records a user identity used for accessing the application.

22. The security gateway of claim 19, wherein the application comprises one of the following; an instant messaging application; an email application; a conferencing application; a voice application; a video application; or a collaboration application.

23. A security gateway comprising:
a hardware processor; and
a memory containing instructions which, when executed by the hardware processor, cause the hardware processor to perform a method, comprising:
recording, via a security gateway, information about an application session between a first host and an application over a network, wherein the information about the application session comprises a first host identity for the first host used to access the application and an application session time;
acquiring information about an access session between a second host and the network, wherein the information about the access session comprises a user identity used for accessing the network through the second host, a second host identity for the second host, and an access session time; and
recording the user identity used for accessing the network, if the first host identity matches the second host identity and the application session time matches the access session time.

24. A non-transitory computer-readable medium storing instructions that, when executed, cause a computer to perform a method for associating first and second user identities, the method comprising:

receiving a first host identity for a first host and a first user identity used in an application session conducted through the first host;
receiving an application session time associated with the application session;
acquiring a second host identity for a second host and a second user identity used in an access session conducted through the second host;
acquiring an access session time associated with the access session; and
associating the first and second user identities if the first host identity corresponds to the second host identity and the access session time corresponds to the application session time.

25. A non-transitory computer-readable medium storing instructions that, when executed, cause a computer to perform a method for associating a user identity used to access a network through a host, the method comprising:
creating an application session record for an application session between a network and an application via a security gateway, wherein the application session record comprises the user identity used for accessing the network through the host, a host identity for the host, and an application session time,
wherein the creating comprises:
sending a query including the host identity and the application session time from the application session record;
receiving, in response to the query, information about an access session between a second host and the network, wherein the information about the access session comprises a second user identity used for accessing the network through the second host, a second host identity for the second host, and an access session time; and
storing the second user identity as the user identity used for accessing the network in the application session record if the host identity in the application session record matches the second host identity and the access session time matches the application session time.

26. A non-transitory computer-readable medium storing instructions that, when executed, cause a computer to perform a method for associating a user identity used to access a network, the method comprising:
recording, via a security gateway, information about an application session between a first host and an application over a network, wherein the information about the application session comprises a first host identity for the first host used to access the application and an application session time;
acquiring information about an access session between a second host and the network, wherein the information about the access session comprises a user identity used for accessing the network through the second host, a second host identity for the second host, and an access session time; and
recording the user identity used for accessing the network, if the first host identity matches the second host identity and the application session time matches the access session time.

* * * * *